United States Patent [19]

Willkie

[11] Patent Number: 5,940,383
[45] Date of Patent: Aug. 17, 1999

[54] AUTOMATIC DATA SERVICE SELECTION

[75] Inventor: James J. Willkie, Poway, Calif.

[73] Assignee: Qualcomm Incorporated, San Diego, Calif.

[21] Appl. No.: 08/593,222

[22] Filed: Jan. 29, 1996

[51] Int. Cl.⁶ .................................................. H04J 3/12
[52] U.S. Cl. .......................................... 370/336; 370/349
[58] Field of Search .................................... 370/315, 321, 370/322, 323, 328, 329, 336, 341, 345, 346, 347, 349, 360, 381, 457, 470, 472; 379/56, 58, 59, 63, 94; 340/825.52, 825.03; 375/219, 222; 455/422, 426, 500, 507, 509, 517

[56] References Cited

U.S. PATENT DOCUMENTS

| | | | |
|---|---|---|---|
| 4,719,458 | 1/1988 | Miesterfeld et al. | 340/825.5 |
| 4,837,858 | 6/1989 | Ablay et al. | 455/509 |
| 4,924,493 | 5/1990 | Dang et al. | 379/94 |
| 5,453,986 | 9/1995 | Davis et al. | 370/62 |
| 5,471,473 | 11/1995 | Tejima | 370/329 |
| 5,473,679 | 12/1995 | La Porta et al. | 379/201 |
| 5,475,681 | 12/1995 | White et al. | 370/346 |
| 5,528,664 | 6/1996 | Slekys et al. | 379/58 |
| 5,533,019 | 7/1996 | Jayapalan | 370/352 |
| 5,533,029 | 7/1996 | Gardner | 370/329 |
| 5,570,367 | 10/1996 | Ayanoglu et al. | 370/346 |
| 5,590,406 | 12/1996 | Bayley et al. | 370/493 |
| 5,657,345 | 8/1997 | Lazaridis | 375/222 |
| 5,697,065 | 12/1997 | Sakata | 455/517 |
| 5,777,991 | 7/1998 | Adachi et al. | 370/352 |

FOREIGN PATENT DOCUMENTS

| | | | |
|---|---|---|---|
| 9521492 | 8/1995 | WIPO . | |
| 9525407 | 9/1995 | WIPO | H04Q 7/22 |

*Primary Examiner*—Alpus H. Hsu
*Assistant Examiner*—Kwang B. Yao
*Attorney, Agent, or Firm*—Russell B. Miller; Charles D. Brown

[57] ABSTRACT

A novel and improved method and apparatus for automatically selecting the proper data service based on the data being transmitted is described. Either packet data service or modem emulation data service is selected by a wireless subscriber unit based on the data received from a computer system or other digital data system. If an AT dial command is received, the wireless subscriber unit enters modem emulation mode. If packet initialization sequence is received, the wireless subscriber unit enters packet data service mode. In the preferred embodiment of the invention, a packet data initialization sequence is comprised of a pre-flag byte dead time, followed by a flag byte, followed by the reception of any additional data within a post flag time interval. Also in the preferred embodiment of the invention, the pre flag dead time is ten character time intervals and the post flag time interval is one character time interval, where a time interval is the time necessary to transmit a single byte of data at the given baud rate.

6 Claims, 2 Drawing Sheets

AUTOMATIC DATA SERVICE SELECTION

BACKGROUND OF THE INVENTION

I. Field of the Invention

The present invention relates to wireless telecommunications. More particularly, the present invention relates to a novel and improved method and apparatus for automatically selecting a data service based on the data being transmitted.

II. Description of the Related Art

The EIS (Electronics Industry Association) and the TIA (Telecommunications Industry Association, 2001 Pennsylvania Avenue, N.W., Washington, D.C. 20006) are industry groups responsible for setting standards to ensure compatibility between computer, telecommunications, and other information processing systems. In accordance with this responsibility, the EIA and TIA have established the IS-99 data services standard for modem emulation data services and the IS-657 data service standard for packet data service. Packet data service provides transport layer packet transmission capability into a packet based network such as the internet. Modem emulation data service provides a dedicated connection to a receiving digital system, and the modulation of digital data into tones in accordance with the use of a standard modem or fax. Modem emulation service also provides for the interpretation and processing of "AT" commands, which are used to control the configuration and processing of the conversion of the digital data into tones. The AT command set is well known in the art, and is defined by the use of the ASCII prefix "AT", in either lower or upper case, followed by anyone of a set of other predefined codes. These other predefined codes include the ASCII characters "DT", either lower or upper case, followed by a telephone number which causes a telephone call to be initiated.

For wireless telecommunication service subscribers who need to connect to a variety of data networks and systems, some of which require a packet based connection and other of which require a modem based connection, it is desirable to have both packet data service and modem emulation data service in a single wireless subscriber unit or cellular telephone. Therefore, providing both packet data service and modem emulation data service in a single wireless subscriber unit increases the usefulness of a wireless subscriber unit, and of the associated wireless telecommunications system. Providing both modem emulation and packet data service, however, also makes it necessary to determine and select the proper type of service for each communication initiated. This determination and selection process can be inconvenient for many users of wireless data communication services, who are often operating in highly mobile environments and switch from one type of service to another in rapid succession. Additionally, many users do not understand the difference between the two types of network connections, and will therefore have trouble selecting the proper type of service for a given communication. This reduces the usefulness of supplying multiple types of data service from a single wireless subscriber unit. Therefore, there is a need for an improved method and apparatus for automatically determining and selecting the desired data service so that a digital connection can properly be established for a variety of communications.

SUMMARY OF THE INVENTION

The present invention is a novel and improved method and apparatus for automatically selecting the proper data service based on the data being transmitted. Either packet data service or modem emulation data service is selected by a wireless subscriber unit based on the data received from a computer system or other digital data system. If an AT dial command is received, the wireless subscriber unit enters modem emulation mode. If packet initialization sequence is received, the wireless subscriber unit enters packet data service mode. In the preferred embodiment of the invention, a packet data initialization sequence is comprised of a pre-flag byte dead time, followed by a flag byte, followed by the reception of any additional data within a post flag time interval. Also in the preferred embodiment of the invention, the pre flag dead time is ten character time intervals and the post flag time interval is one character time interval, where a time interval is the time necessary to transmit a single byte of data at the given baud rate.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

A method and apparatus for automatically selecting the proper data service based on the data being transmitted is provided. In the following description, the invention is set forth in the context of a set of state changes and operations performed by a wireless subscriber unit. In the preferred embodiment of the invention, these state changes and operations are performed via the use of a microprocessor or digital signal processor, or both, implemented via the use of semiconductor integrated circuits controlled by software. As is common in the art, the software takes the form of stored voltages, currents, or magnetic particles, or a combination thereof. In other instances throughout the application various well known systems are described in block form. This is done in order to avoid unnecessarily obscuring the disclosure of the present invention.

Figure 1:
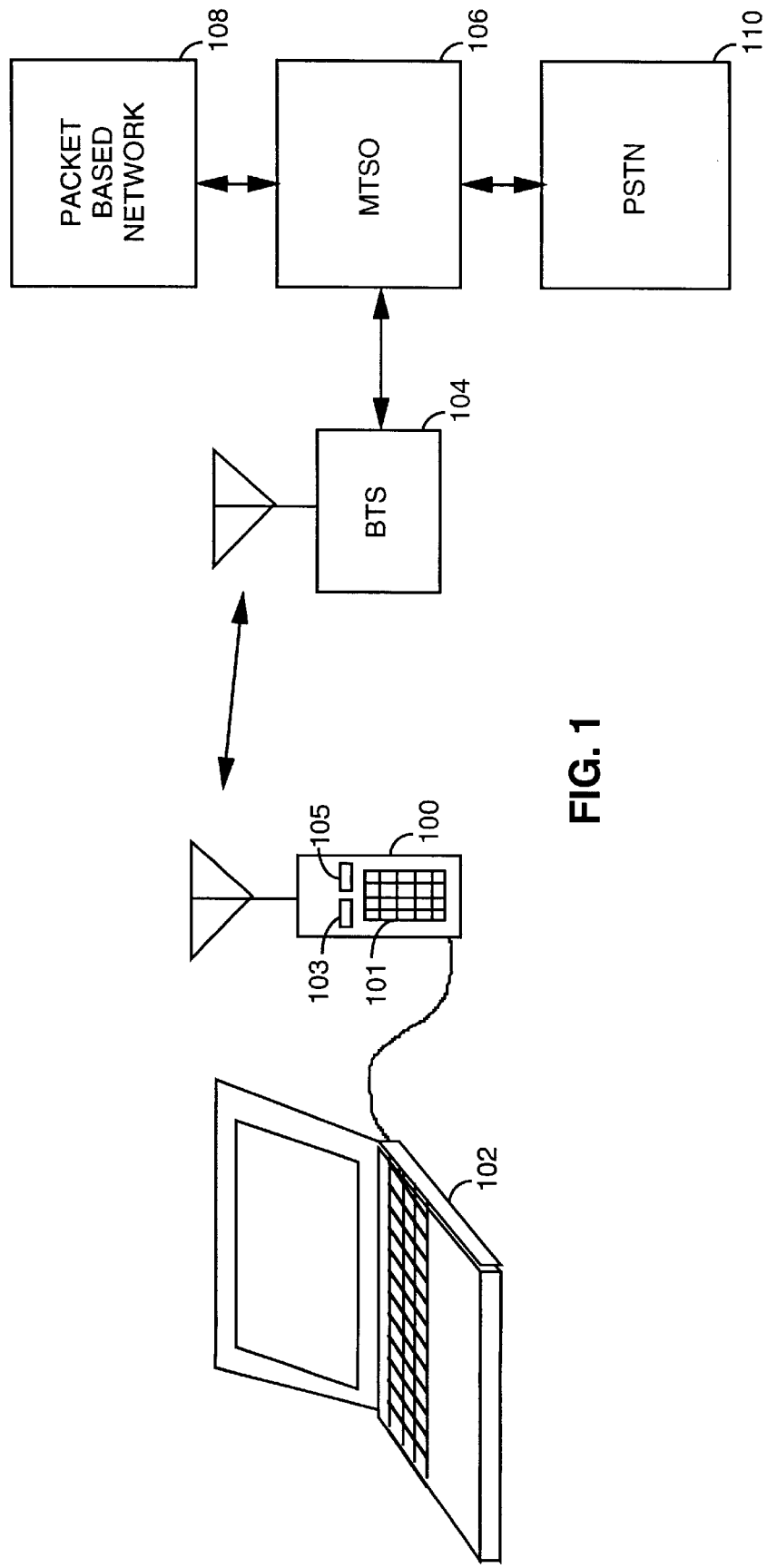
FIG. 1 is a diagram of a digital wireless telecommunications system configured in accordance with one embodiment of the invention.

FIG. 1 is a diagram of a digital wireless telecommunications system configured in accordance with one embodiment of the invention. Subscriber unit 100 is coupled to computer system 102 via a wirebased connection. Subscriber unit 100 also exchanges digital data with base station 104 via radio frequency electromagnetic signals. Base station 104 is coupled to mobile telephone switching office 106 which provides network connection service as well as mobility management service. In the preferred embodiment of the invention, subscriber unit 100 has a keypad 101 used to enter telephone numbers, as well as SEND key 103 and END key 105 that when depressed initiate and terminate a communication respectively. Mobile telephone switching office 106 is connected to both packet based network 108 and public switched telephone network (PSTN) 110. When the described invention is implemented in a digital cellular telephone system, multiple base stations 104 will be coupled to MTSO 106. Additionally, in the preferred embodiment of the invention the RF signals used to exchange information between subscriber unit 100 and base station 104 are processed in accordance with TIA/IS-95 code division multiple access (CDMA) signal modulation techniques for the increased performance such techniques provide including more efficient use of the available RF bandwidth, reduced susceptibility to fade conditions and reduced power requirements.

During operation, subscriber unit 100 receives digital data from computer system 102 via the wirebased connection. In the preferred embodiment of the invention, this data is provided in serial fashion. Subscriber unit 100 monitors this digital data, and determines the desired data service based on the data detected. Once the type of service is determined, subscriber unit 100 initiates communication with base station 104 by establishing a bi-directional RF interface including a forward and reverse link traffic channel over which digital data can be transmitted. As the reverse link connection is established, subscriber unit 100 transmits signaling messages to mobile telephone switching office 106 that indicate the type of service required, as well as any parameters necessary to properly prepare for the call. These parameters include information about the data service option required, the proper state of any emulated modem service, and any telephone number or other address information necessary to complete a network connection.

If subscriber unit 100 determines that the communication requires modem emulation service, it transmits signaling messages to mobile switching center 106 that causes the mobile switching center to establish a network connection via PSTN 110, and to allocate modem emulation resources for converting the digital data being transmitted into tones and converting the tones received into digital data. In the preferred embodiment of the invention, these modem emulation resources are comprised of a digital signal processor (DSP) configured and controlled via the use of software stored in memory, both located within mobile switching center 106. (Not shown.) If the call requires packet based network service, subscriber unit 100 transmits signaling messages to mobile telephone switching center 106 that cause mobile telephone switching center to allocate an IP (interment protocol) routing resource for receiving and routing any data transmitted or received, and for providing network layer functionality. In the preferred embodiment of the invention, this IP routing resource is provided by a microprocessor configured and controlled via the use of software stored in a memory system (not shown) located within mobile telephone switching office 106.

Figure 2:
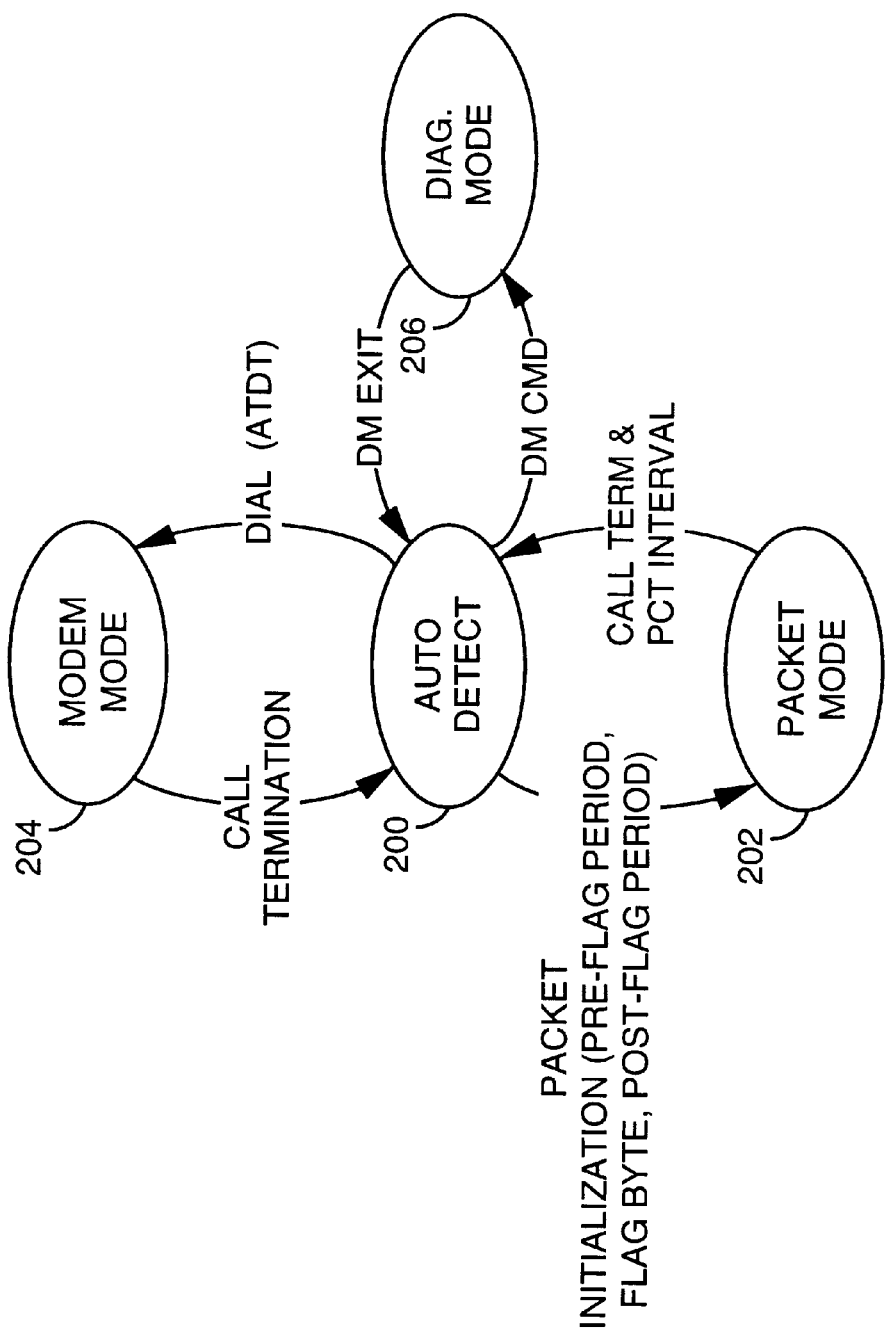
FIG. 2 is a state diagram illustrating the state changes associated with a digital wireless telephone system operating in accordance with one embodiment of the invention.

In accordance with one embodiment of the invention, subscriber unit 100 performs a set of state transitions illustrated in FIG. 2 in order to properly determine the type of data service to provide based on the data received from computer system 102. In the exemplary embodiment provided, the state of subscriber unit 100 is determined by the particular set of software instructions presently being performed by a microprocessor (not shown) located within subscriber unit 100. The software instructions are stored in a memory system (not shown) also located within subscriber unit 100. When first activated, subscriber unit 100 is in auto detect state 200. In auto detect state 200 subscriber unit 100 monitors the data received from computer system 102 and remains in auto detect mode 200 unless one of a set of predetermined sequences of data are received. Additionally, in auto detect mode 200 subscriber unit 100 constantly determines the rate at which the data is being received, a process referred to as autobauding, many techniques for which are well known in the art. When an AT command is detected by subscriber unit 100 during auto detect state 200, subscriber unit 100 processes those AT commands when received. This processing includes the modification of a modem configuration table stored in the memory system located within subscriber unit 100 mentioned above. The modem state table contains all the state information necessary to completely configure a modem compatible with the AT standard.

Upon receipt of an AT dial command during auto detect mode 200, subscriber unit 100 enters modem mode 204. In accordance with the AT standard, an AT dial command consists of a set of data bytes that correspond to the binary ASCII codes for "ATDT", either lower or upper case. This set of data bytes may be followed by an ASCII "space" and a telephone number to dial in accordance with the AT standard. When modem mode 204 is entered, an asynchronous data or fax call is originated by subscriber unit 100 which results in a bidirectional RF interface being established with base station 102 through which a network connection is made to MTSO 106. Using the bidirectional RF interface subscriber unit 100 instructs MTSO 106 to allocate signal processing resources for converting digital data into tones in accordance with the standard operation of a conventional modem, and supplies the AT modem state information to MTSO 106 so that the modem may be properly configured in accordance with any AT commands received by subscriber unit 100 during auto detect mode 200. Once the signal processing resources are allocated, subscriber unit 100 remains in modem mode 204 and transparently passes any data received from computer system 102 to MTSO 106, where that data is converted and introduced into PSTN which routes the data to the receiving system.

While in modem mode 204, subscriber unit 100 also monitors the data received from computer system 102 for a disconnect sequence. In accordance with the AT standard, a disconnect sequence is comprised of a one second time interval during which no data is transmitted, followed by three data bytes equivalent to the ASCII sequence "+++", followed by another one second time interval during which no data is transmitted, although the sequence is configurable by the user via additional AT commands. Upon receipt of a disconnect sequence, subscriber unit 100 transmits a signaling message to MTSO 106 by way of base station 104 indicating the receipt of the disconnect sequence. Base station 104 then discontinues the conversion of data into tones, and processes any additional information received as AT commands used to configure the state of the modem emulation services provided. If the hang-up command is received by MTSO 106, which in accordance with the AT standard corresponds to either a lowercase or uppercase ATH, MTSO 104 transmits a signaling message to subscriber unit 100 indicating call termination. This signaling message causes subscriber unit 100 to return to auto detect mode 200 and to release the bidirectional RF interface. Subscriber unit 100 also switches from modem mode 204 to auto detect mode 200 if the user depresses END key 105 (FIG. 1), if the RF signal exchanged between subscriber unit 100 and base station 104 is lost, or if the carrier detect signal from computer system 102 is deasserted.

Still referring to FIG. 2, when a packet initialization sequence is received from computer system 100 during auto detect mode 200, subscriber unit 100 enters packet mode 202. A packet initiation sequence consists of a pre flag dead time interval, followed by a flag byte, followed by the reception of any additional data within a post flag time interval. In accordance with the PPP (point to point) protocol the flag byte has a hex value of Ox7E, or binary 01111110. In the preferred embodiment of the invention, the pre-packet dead time is ten character time intervals and the post flag byte time interval is one character time interval. A character time interval is the time interval required to transmit a byte of data at the given baud rate. It should be noted that packet initialization sequences are not searched for between the receipt of the ASCII characters 'AT', either lower or upper case, and a return character, as data received at this time is interpreted as an AT command.

Requiring a pre-flag dead time prevents an incidental flag byte occurring within a data stream from being misinterpreted as the beginning of a data packet. Requiring additional data to be received within a post flag byte time interval of less than one character time prevents a single random flag byte from being interpreted as the beginning of a data packet because during orderly operation a complete packet is transmitted at the given baud rate. Also, requiring additional data to occur within such a post flag byte time interval makes it essentially impossible for a person entering data via the keyboard of computer 102 to falsely generate a packet initiation sequence because data cannot be typically be keyed in at normal data rates. While the use of a pre flag byte dead time of ten character time intervals is used in the preferred embodiment of the invention, pre-flag byte dead time intervals of other durations are consistent with the operation of the present invention. In particular, any pre flag byte dead time of greater than one character time interval may be used, although experimentation shows a duration of ten character time intervals provides the best results. Similarly, a post flag byte time intervals of more than one character time interval is also consistent with the operation of the present invention, although the use of a post character time interval of less than one character time interval is preferred.

Upon entering packet mode 202 subscriber unit 100 originates a packet service data call, which results in a bi-directional RF signal interface being established with base station 104, and a network connection being established to MTSO 106. Additionally, as noted above an IP routing resource is allocated within MTSO 106 for providing network layer functionality. The data packet received from computer system 102 includes the flag byte and any subsequent data is then transmitted to the IP resource within MTSO 106 by way of base station 104. MTSO 106 then forwards the data to the appropriate next destination via packet base network 110 using address information contained in each data packet in accordance with the IP protocol, the use of which is well known in the art. The end of the first packet, as well as the beginning and end of subsequent data packets are demarcated by subsequent flag bytes in accordance with the PPP protocol, and each packet received by subscriber unit 100 is transmitted to MTSO 106.

Subscriber unit 100 leaves packet mode 202 and returns to auto detect mode 200 after call termination and the expiration of a post call termination time interval. In the preferred embodiment of the invention, call termination can occur in one of four ways. First, the user may press END key 105 during a communication. Second, the call can be dropped due to loss of one or more of the RF signals exchanged between subscriber unit 100 and base station 104 which can occur for many reasons including too much distance or fade conditions. Third, the call may be terminated due to deassertion of the DTR signal (the use of which is well known in the art) at subscriber unit 100, which is most often caused by disconnecting the cable connecting computer system 102 to subscriber unit 100. In the preferred embodiment of the invention subscriber unit 100 may also be configured to ignore the DTR signal. The fourth method by which a call is terminated is that no data is sent for a time-out period. In the preferred embodiment of the invention, this time-out period is thirty seconds although any other time-out period is consistent with the operation of the present invention. Also, in the preferred embodiment of the invention, the time-out period may be configured by the user via manipulation of the keypad on subscriber unit 100 or via various commands entered via the serial stream of data received by subscriber unit 100 at the data port.

If subsequent to call termination, a new packet initialization sequence is received within the post call termination time interval, subscriber unit 100 remains in packet mode 202 and re-establishes an RF interface with base station 104 and a network connection with MTSO 106 if necessary, as well as transmitting the data packet received. During the post call termination period, subscriber unit 100 continues to perform call flow operations including the processing of CTS and RTS signals, as well as XON and XOFF commands. In the preferred embodiment of the invention, the post call termination period is two seconds. The use of a two second post call termination period allows for orderly termination of data transmission when an unexpected call termination occurs. This orderly termination includes the storage and buffering of data that is received by subscriber unit 100 from computer system 100 such that transmission of that data may resume once the connection is reestablished.

In addition to packet mode 202 and modem mode 204, subscriber unit 100 may also enter diagnostic mode 206. Subscriber unit 100 enters diagnostic mode 206 upon receipt of a diagnostic command generated in accordance with the AT standard, which is comprised of a series of digital data corresponding to the ASCII equivalent of 'ATDM', either lower or upper case. Once in diagnostic mode additional vendor specific commands are responded to in order to determine various characteristics about the operation of subscriber unit 100 and the state of the modem configuration table. Subscriber unit 100 exits the diagnostic mode upon receipt of the diagnostic mode exit command, which in accordance with the AT standard is comprised of the ASCII equivalent of 'ATDM', either lower or upper case.

Thus, a method and apparatus for automatically selecting the proper data service in a digital wireless telecommunications system based on the data being transmitted is described. The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

I claim:

1. A method for automatically selecting the proper data service to provide to a digital wireless telecommunications service subscriber comprising:
    a) monitoring a stream of binary data;
    b) providing packet based data service when a packet initialization sequence is received in said stream of binary data, said packet initialization sequence comprising:
        i) a flag byte;
        ii) a time interval preceding said flag byte during which no data is conveyed; and
        iii) a time interval following said flag byte during which additional data is received; and c) providing asynchronous data service when a dial command is received in said stream of binary data.

2. The method as set forth in claim 1 wherein the time interval preceding said flag byte is of a duration substantially equal to the time required to receive ten bytes of data.

3. The method as set forth in claim 2 wherein the time interval following said flag byte is of a duration substantially equal to the time required to receive one byte of data.

4. A wireless telecommunication system for providing data services via a set of radio frequency signals processed in accordance with code division multiple access modulation techniques comprising:

- a mobile telephone switching office for establishing a packet based network connection and for establishing a channel based network connection; and
- a subscriber unit for receiving digital data and for signaling said mobile telephone switching office to establish modem emulation data service when a dial command is received and for signaling said mobile telephone switching office to establish packet based data service upon receipt of a packet initialization sequence, said packet initialization sequence comprising:

a) a flag byte;

b) a time interval preceding said flag byte during which no data is conveyed; and c) a time interval following said flag byte during which additional data is received.

5. The wireless telecommunication system according to claim 4 wherein said time interval preceding said flag byte is of a duration substantially equal to the time required to receive ten bytes of data.

6. The wireless telecommunication system according to claim 5 wherein the time interval following said flag byte is of a duration substantially equal to the time required to receive one byte of data.

* * * * *